United States Patent Office 3,254,713
Patented June 7, 1966

3,254,713
METHOD OF RECOVERING OIL FROM OIL-PRO-DUCING SANDS UTILIZING COMPOUNDS HAVING EXCEPTIONAL WETTING PROPERTIES
Oscar L. Scherr and Samuel F. Moses, La Mirada, Calif., assignors, by mesne assignments, to Emery Industries, Inc., Cincinnati, Ohio, a corporation of Ohio
No Drawing. Original application June 12, 1961, Ser. No. 116,258. Divided and this application June 6, 1962, Ser. No. 205,148
3 Claims. (Cl. 166—9)

This application is a division of our copending application, Serial No. 116,258, filed June 12, 1961, now abandoned.

There are many applications in modern industry and elsewhere for compounds having exceptional wetting properties.

This invention is directed to a particular application in which compounds having exceptional wetting properties, namely ethoxylated isomeric trimethyl heptanols are utilized in a water flooding process for the recovery of oil from oil-producing sands, for example, sandstone. The presence of such wetting agents in the brine solution utilized for recovery of the oil retained in the sands results in an increase rate of flow of the brine solution with the solution under a given pressure, or conversely permits reduction of pressure for a given flow rate.

These and other objects will be more readily understood from the following discussion.

We have prepared our new compounds from a mixture of isomeric trimethyl heptanols, such as those produced by the well known oxo process, which are excellent starting materials for the preparation of our new compounds.

The general method of preparation of our new compounds involves passing ethylene oxide into the mixture of isomeric trimethyl heptanols using conventional methods until ethoxylated derivatives are formed as desired, varying from one to twenty moles of ethylene oxide contained in a mole of starting material.

While we have found that ethoxylated derivatives of isomeric trimethyl heptanols having from one to twenty moles of ethylene oxide per mole of trimethyl heptanol all showed wetting properties, the ethoxylated derivatives having from two to eight moles of ethylene oxide per mole of trimethyl heptanol possessed superior wetting properties unequaled by any commercial wetting agent known to us. In particular, the derivatives having from two to eight moles of ethylene oxide per mole of trimethyl heptanol displayed exceptional penetration power as indicated by the exceedingly rapid wetting time shown by the well known canvas disk test using a 1 inch diameter canvas disk cut from No. 6 Mt. Vernon duck. All canvas disk tests were made at 25 degrees centigrade using a 0.1% concentration of the wetting agent tested by weight of material in distilled water. The speed of wetting is expressed in seconds.

CANVAS DISK WETTING TIME

| Compound tested: | Wetting time in seconds |
| --- | --- |
| Isomeric trimethyl heptanols plus 2 moles ethylene oxide | 2.7 |
| Isomeric trimethyl heptanols plus 3 moles ethylene oxide | 1.4 |
| Isomeric trimethyl heptanols plus 4 moles ethylene oxide | 2.8 |
| Isomeric trimethyl heptanols plus 5 moles ethylene oxide | 3.1 |
| Isomeric trimethyl heptanols plus 8 moles ethylene oxide | 9.8 |

We believe that the exceptional penetration power of our new compounds, particularly those in the above table, is largely due to isomerization.

To confirm this theory, comparison tests were run in a typical commercial application of our new compounds by adding the 5 mole ethoxylated derivative of the isomeric trimethyl heptanols to a conventional commercial fertilizer in aqueous solution and comparing the wetting time produced thereby, using the canvas disk method and equal concentrations in both cases, to the wetting time obtained by adding a 5 mole ethoxylate of normal decyl alcohol to the same fertilizer in aqueous solution.

Various concentrations by weight of each ethoxylated derivative were used as indicated in the following table, while keeping the same concentration of fertilizer, 37.7% by weight of ammonium phosphate based on available nitrogen. The speed of wetting is expressed in seconds.

COMPARISON OF WETTING TIME

| Percent concentration by weight of ethoxylate in fertilizer solution | Isomeric trimethyl heptanols plus 5 moles ethylene oxide | n-Decyl alcohol plus 5 moles ethylene oxide |
| --- | --- | --- |
| 0.1 | 54.6 | over 180 |
| 0.05 | 60.9 | over 180 |
| 0.025 | 52.1 | over 180 |
| 0.01 | 79.1 | over 180 |

It is apparent from the above table that the 5 mole ethoxylate of the isomeric trimethyl heptanols has a penetration power of over two to over three times greater, depending on the concentration used, than the corresponding 5 mole ethoxylate of normal decyl alcohol, based upon the wetting time indicated by the canvas disk test, when compared in a typical commercial application. Such a wide difference can only be explained on the basis of isomerization.

Improvement in conventional method of treating oil-producing sands, such as oil-bearing sandstone, with brine solutions by utilization of our new compounds will be demonstrated by the following example, which was conducted using the 4 mole ethoxylate of the isomeric trimethyl heptanols.

These methods involve flooding the sandstone by passing large volumes of brine under pressure through the sandstone to remove the oil trapped therein.

A test was run under controlled conditions on a sandstone sample prepared by injecting crude oil having a gravity of 37.1 degrees A.P.I. into a section of permeable sandstone core having a diameter of 3½ inches. A brine solution was prepared by mixing fresh water and granulated bulk salt resulting in a brine solution with a chloride ion content of 51,000 p.p.m. This brine solution was then passed through the sandstone core at a rate of 5.2 cc. per minute under a pressure of 80 p.s.i. While the brine solution was passing through the sandstone core, a sufficient amount of the 4 mole ethoxylate of the isomeric trimethyl heptanols was added to the brine soltuion to reach a concentration of 50 p.p.m. of the 4 mole ethoxylate in the brine solution passing through the sandstone core. Without any change in pressure, the rate of flow of the brine solution increased from 5.2 to 10.7 cc. per minute after the 4 mole ethoxylate was added. When the concentration of the 4 mole ethoxylate was increased to 100 p.p.m., the rate of flow of the brine solution through the sandstone core increased to 16.7 cc. per minute without any change in the original pressure of 80 p.s.i.

Thus, the use of the 4 mole ethoxylate significantly increased the rate of flow of the brine solution without any change in water pressure by decreasing the surface tension of the water.

The following are typical examples for the preparation of our new compounds.

*Example 1*

790 grams (5 moles) of isomeric trimethyl heptanols produced by the oxo process and 2 grams of sodium hydroxide pellets were charged into a suitable autoclave, agitated, and purged of air with nitrogen gas. The mixture was heated to a temperature of 145 degrees C., and then 880 grams (20.0 moles) of ethylene oxide were added at a rate such that the maximum pressure did not exceed 175 p.s.i. and that the maximum temperature did not exceed 200 degrees C. After about an hour and a half, the reaction mixture was cooled to a temperature of 85 degrees C., and then 3 grams of glacial acetic acid were added.

The resulting product is a clear, colorless liquid at room temperature and is the calculated 4 mole ethoxylate of the isomeric trimethyl heptanols.

*Example 2*

The process of Example 1 is repeated except for differences in the amount of certain reactants. Instead of the amounts stated therein as to the following reactants, 1100 grams (25 moles) of ethylene oxide and 2.27 grams of sodium hydroxide pellets were used along with 3.4 grams of glacial acetic acid.

The resulting product is a clear, colorless liquid at room temperature and is the calculated 5 mole ethoxylate of the isomeric trimethyl heptanols.

*Example 3*

The process of Example 1 is repeated except for differences in the amount of the reactants. In Example 3, the autoclave was charged with 711 grams (4.5 moles) of isomeric trimethyl heptanols and 5 grams of sodium hydroxide pellets. 1182 grams (26.86 moles) of ethylene oxide were added followed by 8 grams of glacial acetic acid.

The resulting product is a clear, colorless liquid which becomes a semi-solid mass at room temperature and is the calculated 6 mole ethoxylate of the isomeric trimethyl heptanols.

While we have described a certain application and examples of our invention in some detail, it is understood that the scope of our invention is not limited thereby and that numerous variations are possible without departing from the spirit and scope of the invention as claimed hereinafter.

We claim:
1. In the process for the recovery of oil retained in oil-producing sands by flooding the sands with brine solution, the improvement comprising incorporating in the brine solution an ethoxylated derivative of isomeric trimethyl heptanols containing 4 moles of ethylene oxide per mole of isomeric trimethyl heptanol, whereby the rate of flow of the brine solution through the sands is substantially increased while maintaining constant water pressure.
2. The process of claim 1 wherein the concentration of the ethoxylated derivative is from about 50 parts per million to about 100 parts per million of brine solution.
3. In a process for the recovery of oil retained in oil-producing sands by flooding the sands with brine solution, the improvement comprising incorporating in the brine solution an ethoxylated derivative of isomeric trimethyl-heptanol-1, said derivative containing from 2 to 8 mols of ethylene oxide per mol of heptanol and being incorporated in the brine solution in an amount sufficient to improve the wetting action thereof, whereby the rate of flow of the brine solution through the sands is substantially increased at any given water pressure.

References Cited by the Examiner

UNITED STATES PATENTS

| | | | |
|---|---|---|---|
| 2,671,116 | 3/1954 | Kosmin | 252—89 |
| 2,738,325 | 3/1956 | Rydell | 166—9 |

JACOB L. NACKENOFF, *Primary Examiner.*

NORMAN YUDOFF, CHARLES E. O'CONNELL, *Examiners.*

C. H. GOLD, S. J. NOVOSAD, *Assistant Examiners.*